United States Patent [19]
Kolb

[11] 3,884,893
[45] May 20, 1975

[54] CHLORINATED POLYPENTENAMER

[75] Inventor: Günter Kolb, Leverkusen, Germany

[73] Assignee: Bayer Aktiengesellschaft, Leverkusen, Germany

[22] Filed: Dec. 22, 1970

[21] Appl. No.: 100,814

[30] Foreign Application Priority Data
Jan. 10, 1970  Germany.......................... 2000955

[52] U.S. Cl. ........ 260/93.1; 117/124 E; 117/132 R; 204/159.2; 260/23 R; 260/33.6 PQ; 260/33.8 UA; 260/82.1; 260/88.2 S
[51] Int. Cl. ........................ C08f 5/00; C08f 27/02
[58] Field of Search................ 260/88.25, 93.1, 82.1

[56] References Cited
UNITED STATES PATENTS
2,748,105  5/1956  Becker et al...................... 260/85.3

| | | | |
|---|---|---|---|
| 3,293,226 | 12/1966 | de Schryver...................... | 260/85.1 |
| 3,449,310 | 6/1969 | Dall'Asta et al.................. | 260/93.1 |
| 3,458,489 | 7/1969 | Natta et al........................ | 260/93.1 |
| 3,577,400 | 5/1971 | Judy................................. | 260/88.2 |
| 3,798,291 | 3/1974 | Dall'Asta et al.................. | 260/93.1 |

FOREIGN PATENTS OR APPLICATIONS
853,273  12/1969  Italy................................ 260/93.1

*Primary Examiner*—Stanford M. Levin
*Attorney, Agent, or Firm*—Connolly & Hutz

[57]  ABSTRACT

Chlorinated products of cyclopentene homopolymers and of cyclopentene copolymers containing 30 to 70 percent by weight chlorine and a process for producing these chlorination products.

1 Claim, No Drawings

CHLORINATED POLYPENTENAMER

The invention relates to chlorination products of polymers of cyclopentene and to a process for their preparation.

It is known to prepare synthetic polymers of conjugated diolefines or polyolefinic chlorination products, which have gained wide technical interest, by reacting natural rubber with chlorine.

One object of this invention are chlorination products of polymers of cyclopentene, in particular those having a chlorine content of 30 to 70 percent by weight. Another object of the invention is a process for the production of chlorination products of polymers and of copolymers of cyclopentene, wherein polymers or copolymers of this type are treated, at temperatures of between 0° and 150° C, with chlorine or substances which liberate chlorine, the reaction being, if desired, carried out in the presence of free catalysts and/or under the influence of actinic light.

Polymers of cyclopentene within the meaning of the present invention are products obtained by ring opening polymerisation of cyclopentene. These are also known as polypentenamers. Polymers of this type, and copolymers of cyclopentene with other cycloolefines or diolefines which are obtained by ring opening polymerisation, are already known and have been described, for example in U.S. Pat. No. 3,074,918 and in British Pat. Nos. 1,010,860; 1,035,282 and 1,098,340.

The chlorination of these products according to the invention may be carried out with elementary chlorine or with other chlorinating agents, for example sulphuryl chloride, phosphorus pentachloride, phosphorus oxychloride or antimony pentachloride. Free radical catalysts which may be present during the chlorination are the usual free radical forming compounds such as peroxides, hydroperoxides or diazo compounds.

The treatment of the cyclopentene polymers with chlorine or with chlorinating agents may be carried out with the polymers in a finely divided solid form, in solution or in aqueous or organic suspension or dispersion. The temperatures used may vary within wide limits, e.g. between 0° and 150° C. In cases where it is important that the polymers should undergo little or no degradation during the chlorination process, chlorination temperatures of below 100° C. are employed, e.g. 50° – 95° C. If, on the other hand, rapid chlorination and reduction of the viscosity (degradation) of the polymers is required, temperatures about or above 100° C. may be employed, preferably temperatures of 95° – 120° C. Degradation of the polymers is also promoted if air, oxygen or substances which liberate oxygen are present together with the chlorine or chlorinating agents, if desired in the presence of substances which provide free radicals. According to a preferred method, chlorination is carried out in organic solvents which are resistant to chlorine, e.g. chloroalkanes and chlorinated aromatic compounds, e.g. carbon tetrachloride, chloroform, tetrachloroethane, trichloroethylene, perchloroethylene, pentachloroethane, chlorobenzene or dichlorobenzene. The concentration of the solutions used is not critical. The chlorination reaction process exothermally, especially at first, and can therefore very easily be carried out, either intermittently or continuously. In order to accelerate the chlorination, it is sometimes advantageous to carry out the process in the presence of actinic light or of substances which yield free radicals, e.g., cyclohexyl-percarbonate, benzyl peroxide, tert. butyl hydroperoxide or azobisisobutyronitrile.

In principle, any polymers of cyclopentene are suitable for chlorination. Polymers which are soluble in the solvents mentioned above are preferred. They may be chlorinated in a very dilute or in a concentrated form. The possible concentrations of the solutions for chlorination are limited in concentration by the solubility of the polymer in the solvent and in dilution by economical considerations. As a general rule, solutions having a solids content of about 1–50 percent would be used. For the production of chlorination products of polymers of cyclopentene having a given final viscosity, mixtures of cyclopentene polymers of different molecular weights may be used because the extent of degradation in the course of chlorination depends on the molecular weight. Chlorination may be carried out as a so-called "stepped" reaction, for example by starting the chlorination at elevated temperatures and then finishing it after reduction of the temperature, or alternatively chlorination may be carried out at first at lower temperatures and then completed at elevated temperatures, if desired under pressure.

Polycyclopentene chlorination products having a chlorine content of 30–45 percent by weight are soft products with a very elastomeric character which may be used as plasticisers for polymers, especially for polyvinyl chloride, or for the production of elastomer films or shaped articles. These products can also be cross-linked with known cross-linking agents such as peroxides, amines or polyvalent metal compounds. Products having a higher chlorine content, e.g., 60 to 70 percent by weight, are suitable for the production of coatings and have the character of lacquer raw materials. They are glass-clear and have practically no colour of their own.

The usual stabilisers such as phenoxypropylene oxide or zinc, lead, magnesium or cadmium salts of long-chain organic carboxylic acids (preferably $C_8$–$C_{24}$) or tin compounds etc. may be added to the chlorination products although this is generally not necessary.

Chlorination products prepared in solution may be isolated from the solution by the usual methods. Thus for example they may be precipitated in lower aliphatic alcohols (preferably alkanols having one to six carbon atoms) or the solid products may be isolated by introducing the solution into boiling water or by blowing out the organic solvent with steam, or the solvent may be removed directly by spray drying in a tower.

The chlorination products of polymers of cyclopentene are surprisingly practically colourless (low colour number values) in contrast to chlorinated diolefines, and exhibit excellent stability when exposed to heat. They have a surprisingly high elasticity compared with chlorinated polyolefines.

In addition, they have good film-forming properties, rapid drying, good compatibility with plasticisers and other natural or synthetic resins and high compatibility with pigments.

The chlorination products of cyclopentene which have a predominantly (i.e., least 80 percent and preferably 85 to 99 percent) transstructure should be mentioned particulary because with higher chlorine contents they can be directly dissolved in drying oils such as linseed oil without special auxiliary agents and they are completely compatible with stand oil (= linseed oil which has been heated to 250° to 300° C with exclusion of air in an aluminum vessel) and most alkyd resins. In addition, even highly pigmented coatings of these chlorination products have a substantially higher bond strength combined with high surface hardness, even on glass and light metal. Moreover, in the known fields of application of chlorination polymers, such as in corrosion protection and rust protection, increased protection and longer life of the protected surfaces are achieved.

EXAMPLE 1

500 Parts of a polycyclopentene having a transcontent of 92 percent and an intrinsic viscosity of 1.5 are dissolved in 4,500 parts of tetrachloroethane. A vigorous stream of chlorine is introduced into the solution at room temperature with stirring, heating and liberation of hydrochloric acid thus being achieved within a short time. As soon as the absorption of chlorine starts to slow down, the temperature of the chlorination solution is raised to 70° C. and more chlorine is introduced until no more uptake of chlorine is observed. Some of the solvent is then distilled off under vacuum while a slow stream of air is passed through, and excess chlorine and the hydrochloric acid which is formed escape. The chlorination solution treated in this way is stirred with a small amount of solid sodium carbonate, filtered and introduced in a fine stream into methanol with stirring. The chlorination product then separates in a finely divided, fibrous form. After washing and drying of the precipitate, a 30 percent solution of the chlorination product in xylene is prepared and this solution is heated to 100° C. The solution remains completely colourless even after 6 hours heating and shows no sign of hydrochloric acid being split off. The chlorination product has a chlorine content of 66.8 percent, and when painted on aluminium from a solution in xylene it produces a glass-clear, hard, firmly adhering and highly elastic coating.

EXAMPLE 2

100 Parts of a polycyclopentene having a transcontent of 90.7 percent and an intrinsic viscosity of 2.9 are dissolved in 2,500 parts of chlorobenzene. A total of 500 g. of chlorine are introduced with stirring at 80° C. with the addition of 0.5 g. of benzoyl peroxide, another 0.2 g. of benzoyl peroxide being added to the chlorination solution when 100, 200, 300 and 400 g. of chlorine, respectively, have been introduced. Excess chlorine and dissolved hydrochloric acid are removed by partial distillation in vacuum. The residual solution is neutralised with a 0.5 percent soda solution and the solvent is driven off by passing in steam. After centrifuging and drying, the product has a chlorine content of 64.3 percent and dissolves in aromatic solvents to form a colourless solution. Films produced from this solution on metal are hard, highly elastic and exceptionally heat-resistant.

EXAMPLE 3

100 Parts of a polycyclopentene having a transcontent of about 60 percent and an intrinsic viscosity of 0.8 are dissolved in 400 parts of pentachloroethane and chlorinated and worked up as in Example 1. A colourless chlorination product having a chlorine content of 68 percent is obtained.

EXAMPLE 4

10 Parts of a polycyclopentene having a transcontent of about 60 percent and an intrinsic viscosity of 0.8 are dissolved in 490 parts of carbon tetrachloride. 25 Parts of sulphuryl chloride are slowly introduced dropwise with stirring at 70° C. and the reaction mixture is then stirred overnight at 70° C. After working up in methanol, a chlorination product having a chlorine content of 45 percent is obtained.

EXAMPLE 5

400 Parts of sulphuryl chloride are added to 2,500 parts of the polymer solution from Example 2 at 70° C. with stirring and then left at this temperature for 4 hours. After working up, a pure white, fibrous product is obtained which dissolves in aromatic solvents to yield a colourless solution and has a chlorine content of 58.5 percent.

EXAMPLE 6

10 Parts of a polycyclopentene having a transcontent of 90.7 percent and an intrinsic viscosity of 2.9 are dissolved in 490 parts of trichloroethylene, and 40 g. of chlorine are introduced while the reaction mixture is stirred and exposed to a mercury vapour lamp. The solution is worked up as described. A product having a chlorine content of 62.3 percent is obtained.

I claim:
1. Chlorinated polypentenamers having a chlorine content of 60 to 70 percent by weight.

* * * * *